United States Patent
Chang

(10) Patent No.: US 8,358,850 B2
(45) Date of Patent: Jan. 22, 2013

(54) DETERMINATION METHOD OF EDGE DIRECTION

(75) Inventor: Fang-Chen Chang, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1524 days.

(21) Appl. No.: 11/902,298

(22) Filed: Sep. 20, 2007

(65) Prior Publication Data

US 2008/0218528 A1 Sep. 11, 2008

(30) Foreign Application Priority Data

Mar. 7, 2007 (TW) ............................... 96107929 A

(51) Int. Cl.
*G06K 9/48* (2006.01)
(52) U.S. Cl. ........................................ 382/199; 382/266
(58) Field of Classification Search .................. 382/199, 382/266
See application file for complete search history.

(56) References Cited

U.S. PATENT DOCUMENTS

| | | | | |
|---|---|---|---|---|
| 6,421,090 B1* | 7/2002 | Jiang et al. | | 348/452 |
| 6,466,693 B1 | 10/2002 | Otsu et al. | | |
| 7,075,580 B2* | 7/2006 | Jiang | | 348/448 |
| 7,406,208 B2* | 7/2008 | Chiang | | 382/266 |
| 7,460,734 B2* | 12/2008 | Chao | | 382/300 |
| 7,548,663 B2* | 6/2009 | Chao | | 382/300 |
| 2004/0170318 A1 | 9/2004 | Crandall et al. | | |
| 2005/0073607 A1 | 4/2005 | Ji et al. | | |
| 2005/0163401 A1* | 7/2005 | Park et al. | | 382/300 |
| 2006/0152621 A1* | 7/2006 | Orlick | | 348/448 |

FOREIGN PATENT DOCUMENTS

| | | |
|---|---|---|
| TW | I230010 | 3/2005 |
| TW | 200513118 A | 4/2005 |
| TW | 200636607 A | 10/2006 |

* cited by examiner

*Primary Examiner* — Eric Rush
(74) *Attorney, Agent, or Firm* — Rabin & Berdo, P.C.

(57) ABSTRACT

An edge direction determination method for a pixel of a display picture. The display picture has a corresponding edge map. The pixel has corresponding pixel direction pairs. First, in step (a), it is judged whether the pixel is an edge pixel according to the edge map. Next, in step (b), it is judged whether the pixel has a right-inclined edge direction or a left-inclined edge direction when the pixel is the edge pixel. Then, in step (c), the edge direction of the pixel is determined according to specific pixel direction pairs corresponding to the same inclined edge direction if a judged result in step (b) is affirmative. Finally, in step (d), if the judged result in step (b) is negative, it is judged whether the pixel has a horizontal edge direction or a vertical edge direction.

2 Claims, 4 Drawing Sheets

DETERMINATION METHOD OF EDGE DIRECTION

This application claims the benefit of Taiwan application Serial No. 96107929, filed Mar. 7, 2007, the subject matter of which is incorporated herein by reference.

BACKGROUND OF THE INVENTION

1. Field of the Invention

The invention relates in general to an image processing technology, and more particularly to an edge direction determination method using an edge map.

2. Description of the Related Art

In the image processing technology, the quality of the output image after the associated de-interlacing or scaling process has been performed significantly depends on the edge direction of each edge pixel in a display picture. Thus, it is an important subject in the industry to enhance the precision of the edge direction while keeping the operation efficiency of the hardware.

SUMMARY OF THE INVENTION

The invention is directed to an edge direction determination method of properly screening pixel direction pairs corresponding to a to-be-processed pixel, which is an edge pixel, according to an edge map corresponding to a display picture, and of further determining an edge direction of the to-be-processed edge pixel according to the screened pixel direction pair. The required calculation is simplified, and the correctness of the edge direction is greatly enhanced.

According to the present invention, an edge direction determination method for a pixel of a display picture is provided. The display picture has a corresponding edge map. The pixel has corresponding pixel direction pairs. First, in step (a), it is judged whether the pixel is an edge pixel according to the edge map. Next, in step (b), it is judged whether the pixel has a right-inclined edge direction or a left-inclined edge direction when the pixel is the edge pixel. Then, in step (c), the edge direction of the pixel is determined according to specific pixel direction pairs corresponding to the same inclined edge direction if a judged result in step (b) is affirmative. Finally, in step (d), if the judged result in step (b) is negative, it is judged whether the pixel has a horizontal edge direction or a vertical edge direction.

The invention will become apparent from the following detailed description of the preferred but non-limiting embodiments. The following description is made with reference to the accompanying drawings.

DETAILED DESCRIPTION OF THE INVENTION

Figure 1A:
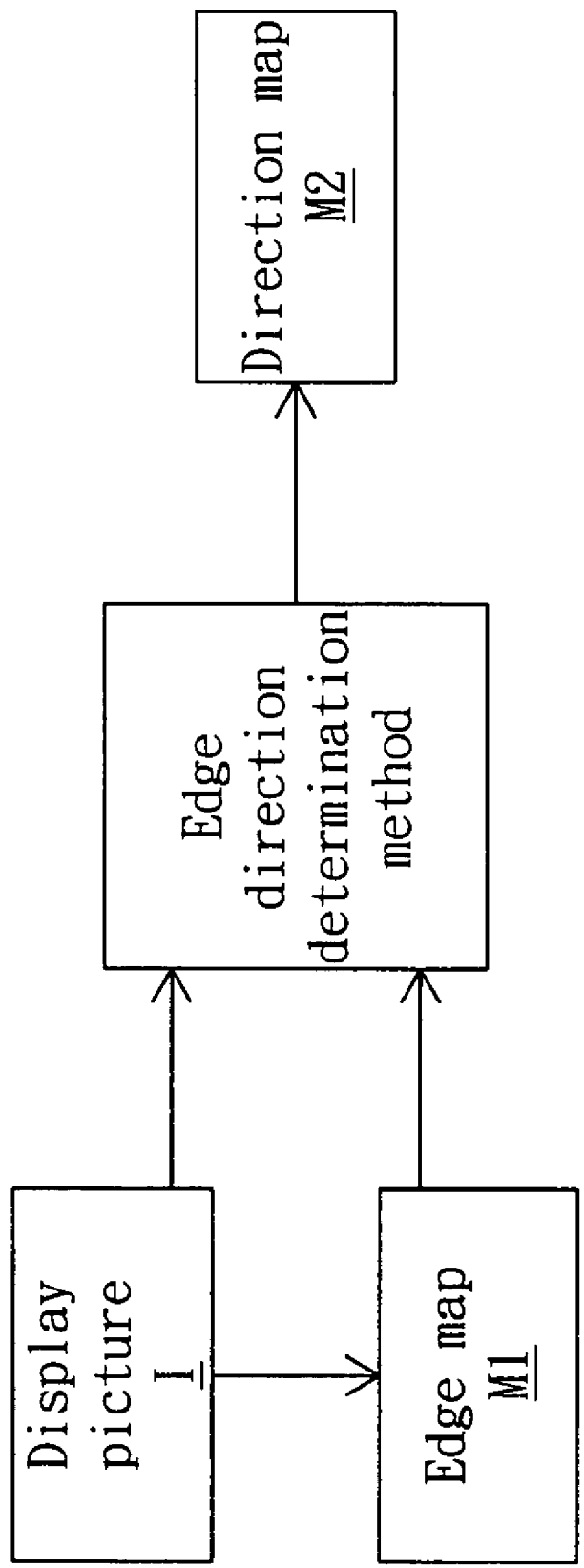
FIG. 1A is a conceptual diagram showing an application to an edge direction determination method according to the invention.

As shown in FIG. 1A, various edge detection algorithms, such as Sobel, Canny, or Prewitt edge detecting methods, may be adopted to perform the associated calculation of edge characteristic acquiring on an display picture I so that a corresponding edge map M1 is obtained. The edge map M1 records digital data regarding whether each pixel in the display picture I is classified into an edge pixel or a non-edge pixel according to the adopted edge detection algorithm. The edge direction determination method of the invention screens the pixel direction pairs for each edge pixel, which is an edge pixel, in the display picture I according to the edge map M1, and then determines the edge direction thereof according to the pixel data (e.g., the luminance value) of the display picture I so that a direction map M2 recording the edge direction of each edge pixel is obtained.

Figure 1B:
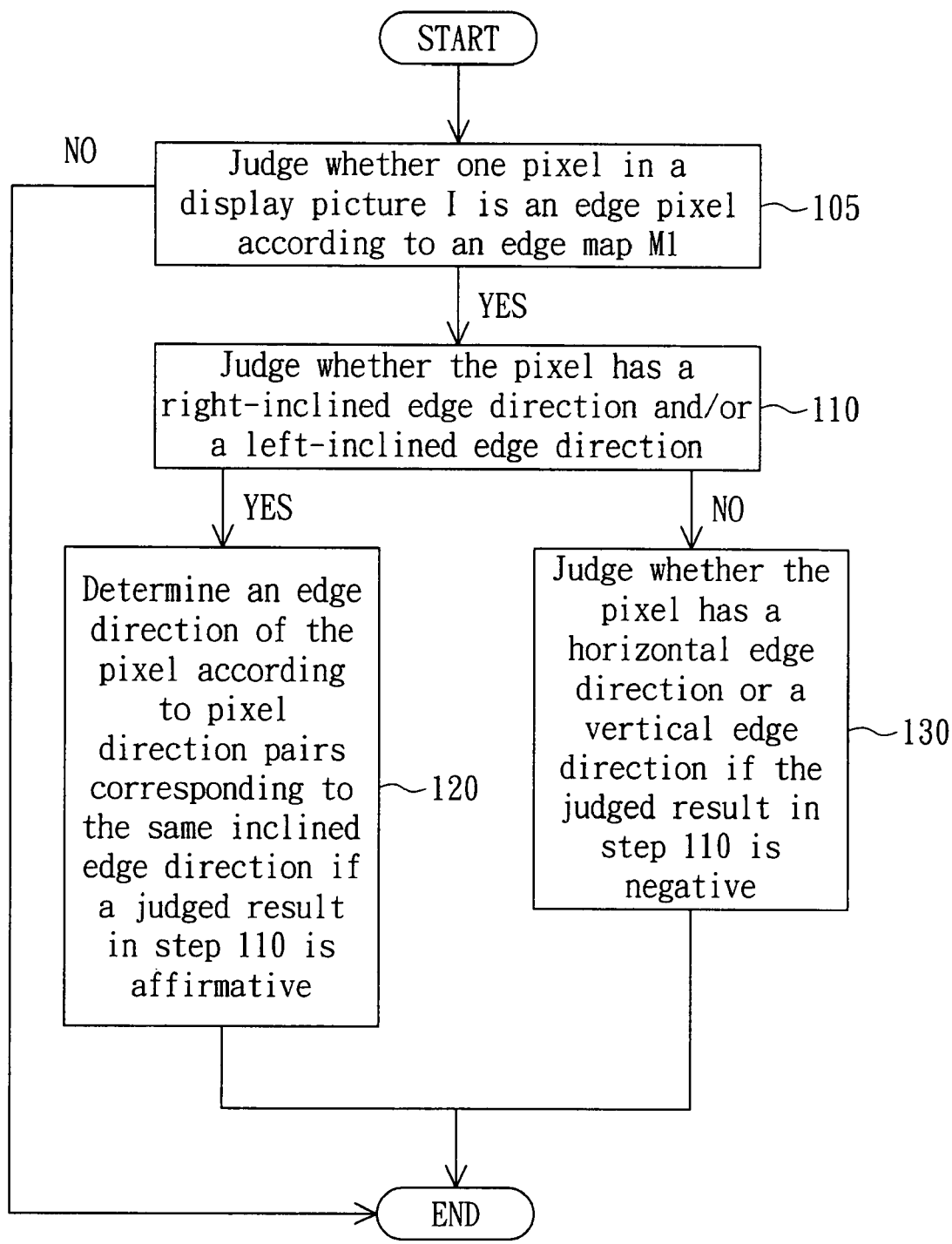
FIG. 1B is a flow chart showing the edge direction determination method according to the invention.

FIG. 1B is a flow chart showing an edge direction determination method according to the invention. First, in step 105, it is judged whether a pixel in the display picture I is an edge pixel according to the edge map M1. If not, the subsequent process will not be performed. Then, in step 110, when the pixel is the edge pixel, it is judged whether the pixel has a right-inclined edge direction and/or a left-inclined edge direction, which is to be described later. Next, in step 120, the edge direction of the pixel is determined according to the pixel direction pairs corresponding to the same inclined edge direction if a judged result in the step 110 is affirmative. In addition, in step 130, it is judged whether the pixel has a horizontal edge direction or a vertical edge direction if the judged result in the step 110 is negative.

In step 110, it is initially judged whether the to-be-processed pixel, which is the edge pixel, has the right-inclined edge direction and/or the left-inclined edge direction according to the relative relationships between the to-be-processed pixel and other pixels in the display picture, and the associated pixel direction pairs are further screened in step 120. Thus, it is possible to avoid the drawback of the low precision of the predicted edge direction, which is obtained by processing all the pixel direction pairs according to the prior art. The steps of the embodied method will be described in detail with reference to the accompany drawings.

Figure 2:
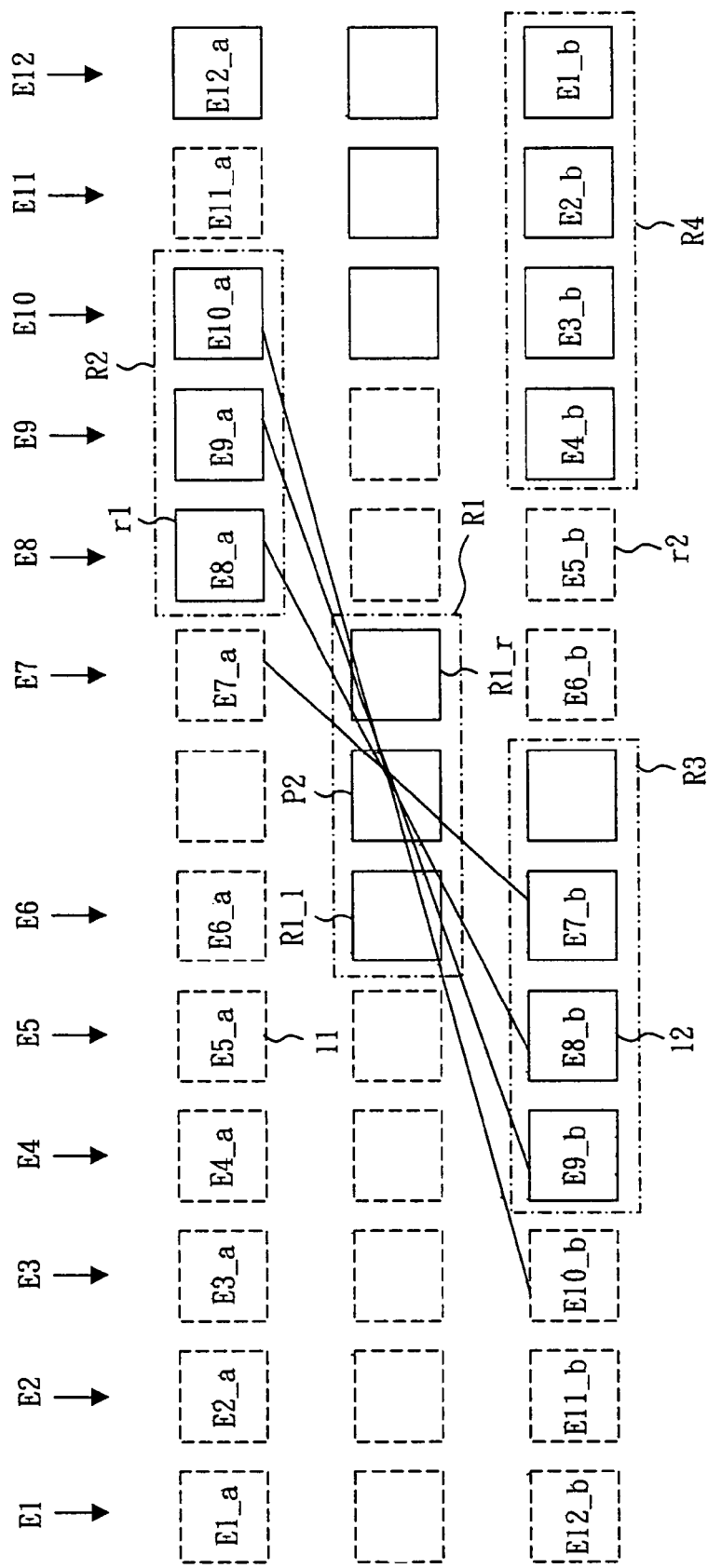
FIG. 2 is a partially schematic illustration showing a display picture I.

FIG. 2 is a partially schematic illustration showing the display picture I. As shown in FIG. 2, it is possible to know whether each pixel is the edge pixel or the non-edge pixel according to the edge map M1 of the display picture I. In FIG. 2, the edge pixel and the non-edge pixel are respectively represented by a solid line frame and a dashed line frame. As shown in FIG. 2, a pixel P2 of the display picture I is located in an edge pixel row R1 and has corresponding pixel direction pairs E1 to E12 in a predetermined range. Each pixel direction pair Ei includes two pixels Ei_a and Ei_b, wherein i=1 to 12. The edge pixel row R1 includes the pixel P2 and further includes a rightmost edge pixel R1_r and a leftmost edge pixel R1_l. The corresponding directions of the pixel direction pairs E1 to E6 are the left-inclined edge directions from the upper-left corner to the lower-right corner, and the corresponding directions of the pixel direction pairs E7 to E12 are the right-inclined edge directions from the upper-right corner to the lower-left corner. Of course, the default searching range may be adjusted according to the computing ability of the hardware or other considerations.

Figure 3:
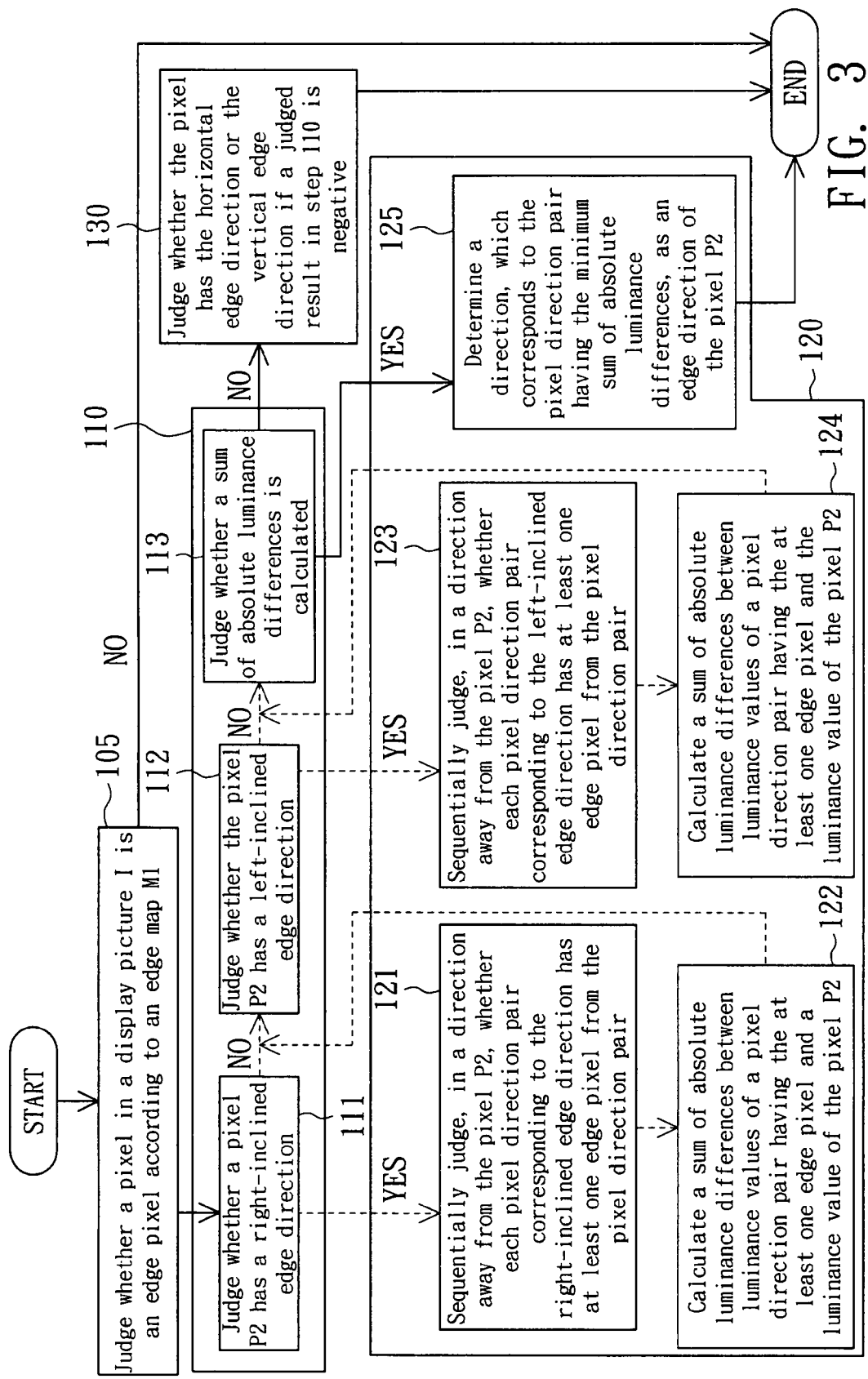
FIG. 3 is a flow chart showing the edge direction determination method according to the preferred embodiment of the invention.

FIG. 3 is a flow chart showing the edge direction determination method according to the preferred embodiment of the invention. If the to-be-processed pixel is the pixel P2, the pixel P2 may be judged as an edge pixel in step 105 according to the above-mentioned description, and then the procedure enters step 110. In this embodiment, it is judged whether the pixel P2 has the right-inclined edge direction in step 111 according to the following rules. When at least one of the upper-right pixel E8_a of the rightmost edge pixel R1_r and the lower-left pixel E8_b of the leftmost edge pixel R1_l is the edge pixel, the pixel P2 has the right-inclined edge direction. As shown in FIG. 2, the pixels E8_a and E8_b are respectively located in the edge pixel rows R2 and R3. So, it is possible to judge that the pixel P2 has the right-inclined edge direction in the step 111, and then the procedure enters step 121 in step 120.

In the step 121, when the pixel P2 has the right-inclined edge direction, it is sequentially judged, in a direction away from the pixel P2 (i.e., from E7 to E12), whether each pixel direction pair corresponding to the right-inclined edge direction has at least one edge pixel from the pixel direction pair (i.e., E7), which is closest to the pixel P2 and corresponds to the right-inclined edge direction, until a first pixel direction pair is judged as having the at least one edge pixel and a next pixel direction pair has no edge pixel at a first time. As shown in FIG. 2, the first pixel direction pair may be judged as E10, and the procedure enters step 122.

In the step 122, a sum of absolute luminance differences between the luminance values of the pixel direction pairs having at least one edge pixel and the luminance value of the pixel P2, which are judged in the step 121, is calculated. As can be understood from the step 121, the pixel direction pairs that have to be processed in the step 122 include E7 to E10. Taking the pixel direction pair E7 as an example, if the two pixels E7_a and E7_b of the pixel direction pair E7 and the pixel P2 respectively have the luminance values y7_a, y7_b and Y, the sum of absolute luminance differences between the luminance levels of the pixel direction pair E7 and the luminance level of the pixel P2 is defined as $|y7\_a-Y|+|y7\_b-Y|$. Four sums of absolute luminance differences may be obtained according to the same definition, and A7, A8, A9 and A10 respectively represent the calculated results obtained from the pixel direction pairs E7, E8, E9 and E10.

After the step 122 is finished, the procedure again goes back to step 112 in the step 110 to judge whether the pixel P2 has the left-inclined edge direction according to the reference similar to that for the right-inclined edge direction mentioned hereinabove. That is, when at least one of the upper-left pixel E5_a of the leftmost edge pixel R1_1 and the lower-right pixel E5_b of the rightmost edge pixel R1_r is the edge pixel, the pixel P2 has the left-inclined edge direction. As shown in FIG. 2, it is possible to judge that the pixel P2 does not have the left-inclined edge direction in the step 112 so that the steps 123 and 124 are not performed on the pixel direction pairs E1 to E6 having the corresponding directions being the left-inclined edge directions, and that the procedure enters step 113.

In the step 113, it is judged whether the sum of absolute luminance differences is calculated. As mentioned hereinabove, the pixel P2 has the right-inclined edge direction and the associated four sums A7 to A10 of absolute luminance differences are calculated. At this time, the procedure enters step 125 in the step 120.

In the step 125, it is determined that a direction corresponding to the pixel direction pair having the minimum sum of absolute luminance differences is the edge direction of the pixel P2. Compared the values of A7 to A10 with one another, if A8 is the minimum sum of absolute luminance differences, it is determined that the direction (the extending direction of the line segment from the pixel E8_a to the pixel E8_b) corresponding to the pixel direction pair E8 is the edge direction of the pixel P2 in the step 125. After the edge direction of the pixel P2 is determined, it represents that the edge direction can be stored in the direction map M2 with the suitable value of the edge direction.

Of course, when the other pixels are processed, it is possible to obtain the negative results in both the steps 111 and 112 when the distribution of the edge pixel rows around the pixel is too far so that no inclined edge direction exists, for example. At this time, the procedure enters the step 130 to judge whether the edge direction is the horizontal or vertical edge direction because no calculated result of the sum of absolute luminance differences is obtained in step 113. In addition, it is also possible to perform the step 112 and then the step 111 in another embodiment. Also, in this embodiment, the pixel direction pairs processed are composed of the pixels of the upper and lower rows adjacent to the to-be-processed pixel in addition to the left and right default searching ranges. However, the upper and lower default searching ranges may also be correspondingly adjusted according to the hardware processing ability or the used requirement. For example, the initial number of the initially processed pixel direction pairs may be increased.

In addition, other screening methods different from that mentioned in this embodiment may also be adopted to screen the pixel direction pairs of the left-inclined edge direction and/or the right-inclined edge direction in the steps 121 and 123. Taking FIG. 2 as an example, it is possible to judge whether each pixel direction pair of the right-inclined edge direction has an edge pixel in the step 121 in another embodiment. Consequently, the pixel direction pair E12 is processed in the step 122. In addition, although the pixels adjacent to four corners of the edge pixel row R1, at which the pixel P2 is located, serve as the references for judging the right-inclined and left-inclined edge directions in this embodiment, the references may be adjusted according to the actually used edge detection algorithm or any other consideration. For example, if the upper and lower default searching ranges have to be increased, the number of the upper-right pixels of the upper-right neighboring pixels may be increased to provide the references for judging the right-inclined edge direction so that the number of samples for the calculation of the sum of absolute luminance differences can be increased.

The edge direction determination method according to the embodiment of the invention properly screens the pixel direction pairs corresponding to the to-be-processed pixel, which is the edge pixel, according to the edge map corresponding to the display picture, and further determines the edge direction of the to-be-processed pixel according to the screened pixel direction pair. Thus, the required calculation is simplified, and the correctness of the edge direction is greatly enhanced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An edge direction determination method for a pixel of a display picture, the display picture having a corresponding edge map, the pixel having a plurality of corresponding pixel direction pairs, the method comprising the steps of:
   (a) judging whether the pixel is an edge pixel according to the edge map;
   (b) judging whether the pixel has a right-inclined edge direction and/or a left-inclined edge direction when the pixel is the edge pixel;

(c) determining an edge direction of the pixel according to specific pixel direction pairs corresponding to the same inclined edge direction if a judged result in the step (b) is affirmative; and (d) judging whether the pixel has a horizontal edge direction or a vertical edge direction if the judged result in the step (b) is negative, wherein an edge pixel row in which the pixel is located comprises a rightmost edge pixel and a leftmost edge pixel, and the step (b) further comprises:

(b1) judging whether at least one of an upper-right pixel of the rightmost edge pixel and a lower-left pixel of the leftmost edge pixel is an edge pixel, and judging the pixel as having the right-inclined edge direction if yes; and (b2) judging whether at least one of a lower-right pixel of the rightmost edge pixel and an upper-left pixel of the leftmost edge pixel is an edge pixel, and judging the pixel as having the left-inclined edge direction if yes, wherein the step (c) further comprises:

(c1) judging whether each of the pixel direction pairs corresponding to the same inclined edge direction has at least one edge pixel;

(c2) calculating a sum of absolute luminance differences between luminance values of each of the pixel direction pairs having the at least one edge pixel and a luminance value of the pixel; and (c3) determining a direction, which corresponds to the pixel direction pair having a minimum sum of absolute luminance differences, as the edge direction of the pixel, wherein one of the pixel direction pairs having at least one edge pixel only has one edge pixel, and wherein designating the one edge pixel and the pixel respectively have the luminance values y and Y, the sum of absolute luminance differences between the luminance values of the pixel direction pair and the luminance value of the pixel is $2 \times |y-Y|$ in the step (c2).

2. The method according to claim 1, wherein designating two pixels of each of the pixel direction pairs and the pixel respectively have the luminance values $y\_1$, $y\_2$ and Y, the sum of absolute luminance differences between the luminance values of each of the pixel direction pairs and the luminance value of the pixel is $|y\_1-Y|+|y\_2-Y|$ in the step (c2).

* * * * *